INVENTORS
ROGER E. RISLEY AND
GEORGE D. KISH
BY
ATTORNEY

INVENTORS
ROGER E. RISLEY
AND GEORGE D. KISH
BY
*Robert E. Burns*
ATTORNEY.

United States Patent Office 2,792,240
Patented May 14, 1957

2,792,240

FLEXIBLE CONCRETE PIPE JOINT

Roger E. Risley and George D. Kish, Bradford, Pa., assignors to Dresser Industries, Inc., a corporation of Delaware Application April 27, 1951, Serial No. 223,212

7 Claims. (Cl. 285—230)

This invention relates to concrete pipe and is more particularly concerned with joint structures for concrete pipe whereby an effective, fluid-tight sealing of the joint between abutting concrete pipe sections may be readily achieved.

In the past, concrete pipe joints constructed in accordance with conventional practice have been notoriously inefficient and fluid-tightness has been exceedingly difficult to obtain. This fact has been recognized by the usual specifications for concrete pipe which permit a relatively high rate of leakage when the pipe is in service. Obviously, this disadvantage has greatly limited the suitability of concrete pipe for many purposes. If a fluid-tight joint could be provided, however, concrete pipe would have both economical and practical advantages which would make it highly desirable for many purposes, particularly where a pipe of relatively large diameter is required, e. g. diameters of 2 feet and up. There have, therefore, been several proposals directed to joint structures for concrete pipe which are concerned with the problem of providing a leak-proof joint in concrete pipe lines comparable to those obtainable with steel pipe. While many of these prior proposals are to some extent satisfactory in that the fluid-tightness of the concrete pipe joint is increased, they suffer from various disadvantages which limit their utility. They are, for example, expensive in application, requiring complex fabrication procedures which add greatly to the cost of the pipe and make necessary the use of relatively skilled labor for their proper installation. In other cases they involve sealing structures which are accessible only from inside the pipe, an obvious disadvantage in many cases and making maintenance particularly difficult. In still other cases the prior proposals have involved structures that are relatively rigid and permit little or no deflection of the pipe in service and, as a result, normally-encountered deflection forces frequently cause cracking or other serious damage to the pipe.

It is the principal object of the present invention to provide an improved concrete pipe joint arrangement which avoids the above-enumerated disadvantages and shortcomings of constructions heretofore proposed.

It is a further object of the invention to provide a joint arrangement of the character indicated which is relatively simple in construction and which may be effectively and satisfactorily installed by unskilled labor.

It is another object of the invention to provide a leak-proof joint for concrete pipes which is comparable in effectiveness to joints in steel pipe lines.

It is a further object of the invention to provide a concrete pipe line having fluid-tight, flexible joints which permit reasonable deflection of the pipe line while maintaining the effectiveness of the joint seal.

It is another object of the invention to provide a concrete pipe line with fluid-tight, flexible joints which are accessible from the exterior of the line and greatly facilitate installation and maintenance.

In accordance with the invention, we provide a concrete pipe joint of the bell and spigot type comprising a bell portion having a plurality of tapering axial apertures extending through the bell flange, a compressible gasket member for engagement with the bell flange adjacent the spigot entrance opening, and an annular gasket follower arranged to be drawn toward the bell flange to compress the gasket into sealing relationship between the spigot and the bell flange. In accordance with our invention, the gasket follower is tightened by means of elongated bolts extending through the bell flange apertures and flexibly mounted opposite the follower to provide flexibility on both axial sides of the bell flange.

It is a feature of our joint construction that the joint may be sealed and fluid-tightness effected exteriorly of the pipe and access to the interior of the pipe is wholly unnecessary.

It is another feature of our joint construction that the flexible mounting of the follower bolts combined with the tapered construction of the bolt apertures in the bell flange provide a joint having a substantial range of flexibility, thereby permitting deflection of the concrete pipe without danger of damage or injury to the pipe or the fluid-tightness of the joint.

Other objects and features of our invention will be readily apparent from the following detailed description of illustrative embodiments thereof and from the drawings wherein, Fig. 1 is a fragmentary sectional view of a concrete pipe line having joints embodying features of the present invention;

Figure 1:
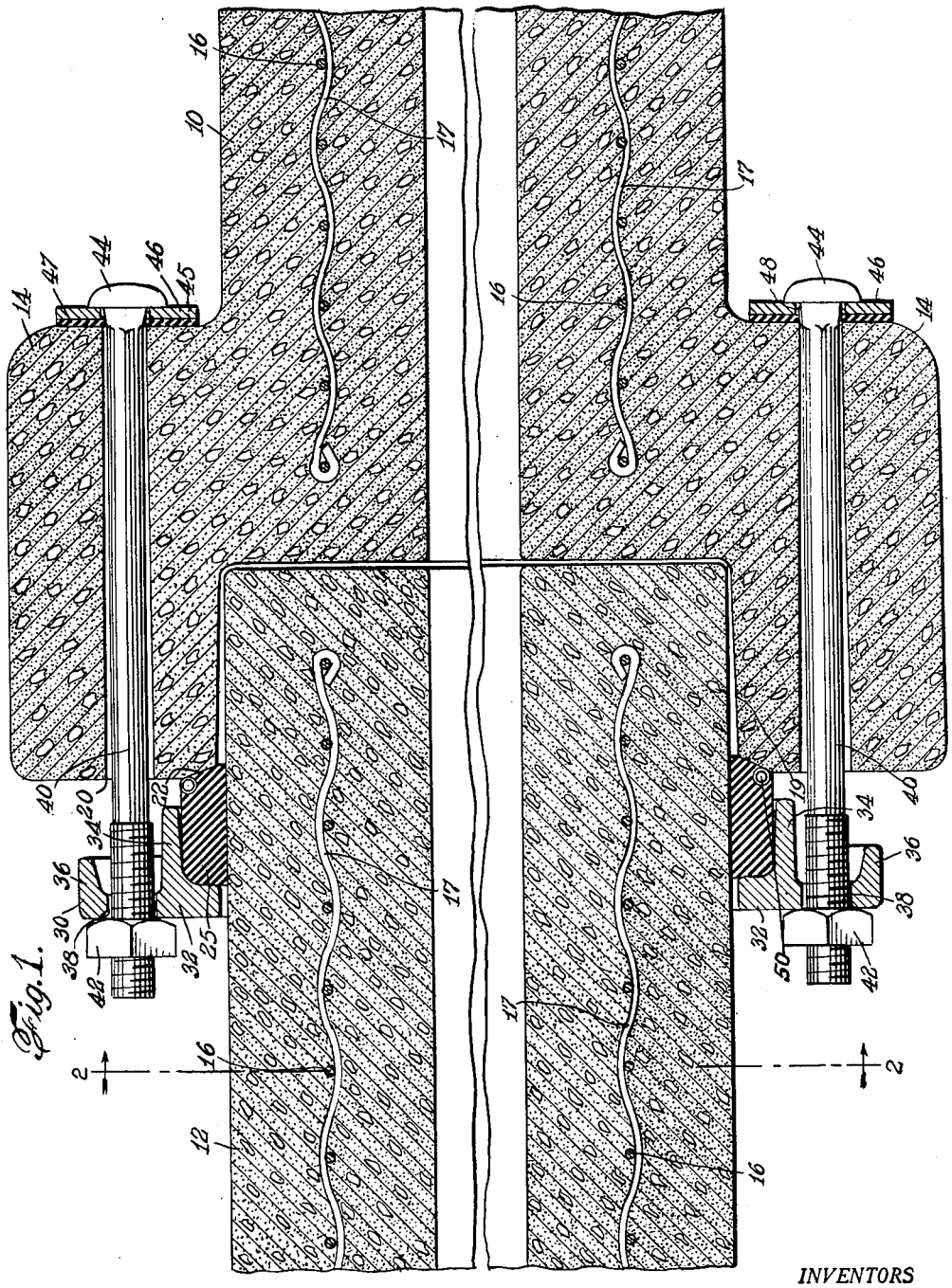
Figure 2:
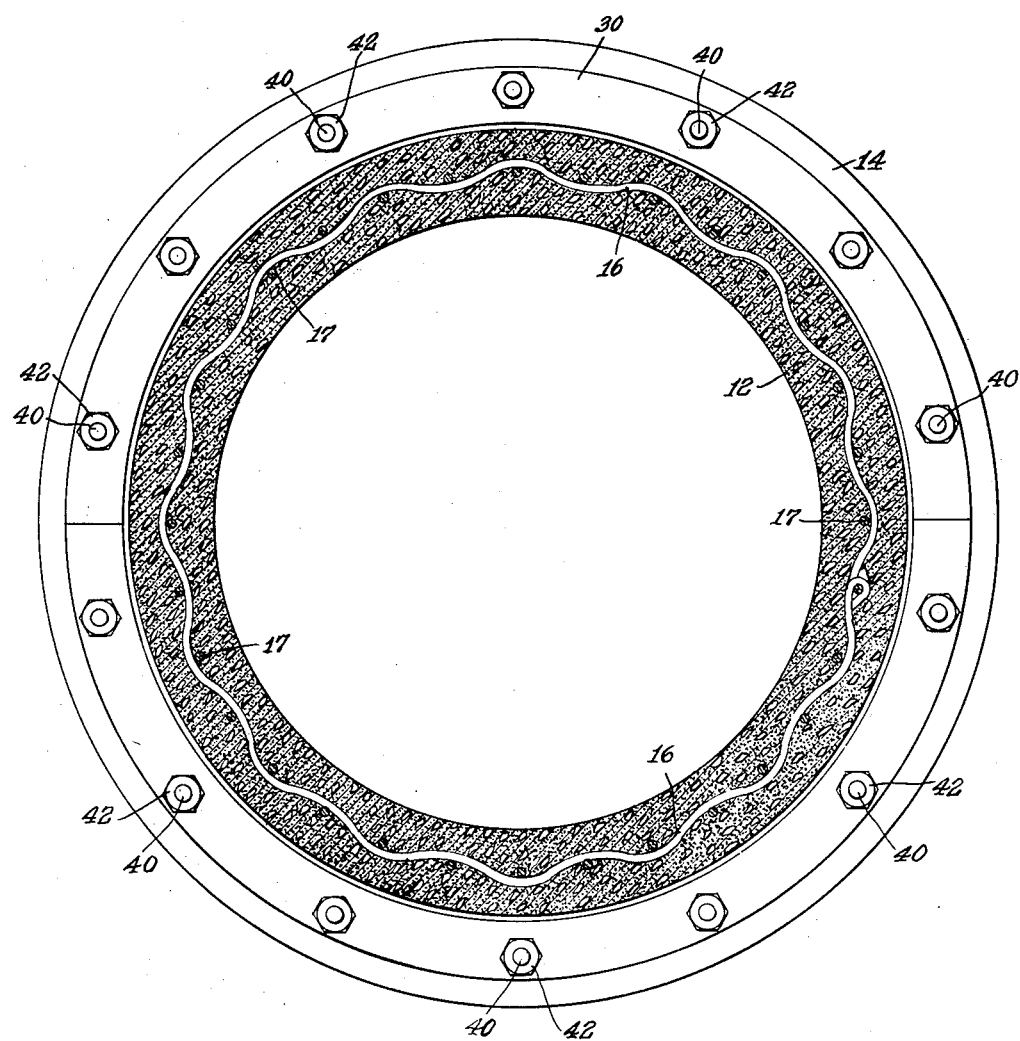
Fig. 2 is a sectional view on a reduced scale taken approximately along the line 2—2 in Fig. 1.

Referring to the drawings, and particularly to Fig. 1 and Fig. 2, there are shown the ends of two abutting sections 10 and 12 of a concrete pipe line, the bell flanged end 14 of section 10 receiving the spigot end of the pipe section 12. The body portions of the concrete pipe sections 10 and 12 are of the usual construction and, as shown in Fig. 1, are advantageously provided with reinforcing wires 16 and 17, embedded in the concrete of the pipe sections in the usual manner.

The bell flange 14 of concrete pipe section 10 is formed with a slightly inwardly-tapering throat 19 in which is received the spigot end of pipe section 12, and the flange proper is formed with a plurality of axial apertures 20 which taper outwardly toward the end of the pipe section 10 and thus have a frusto-conical configuration. In the embodiment illustrated in Fig. 1 and Fig. 2, the inner surface of the flange 14 adjacent the throat 19 is formed with an inwardly-directed bevel 22 to define a gasket recess. The slope of the beveled surface 22 may of course vary but is advantageously an acute angle, preferably, an angle of 30° to 75°, with respect to the axis of the pipe section 10.

Seated around the spigot pipe section 12, and adapted to be compressed into the gasket recess defined by beveled surface 22, is a resilient gasket member 25. The gasket 25 is annular in form and is formed from rubber or rubber composition, this term being used generically to include natural and synthetic rubbers and elastomeric compounds, or compositions having like properties and characteristics. The material forming the gasket 25 is relatively firm and solid but sufficiently resilient and elastic to flow under pressure to conform to the surfaces between which it is confined. Advantageously, although not necessarily, the gasket 25 is formed from a rubbery composition which is relatively resistant to attack by hydrocarbon gases and oils. Examples of such resistant rubbery compositions suitable for use with our concrete pipe joint construction are neoprene (polychloroprene) and butadiene-acrylonitrile copolymers, such as those known commercially by the trade designations Buna–N or GR–A. Our invention, however, is not limited to these specific materials, and particularly when special resistance to hydrocarbon gases and oils is not required, any rubbery composition having the above-noted characteristics may be employed.

The gasket 25 is compressed into sealing engagement with concrete pipe sections 10 and 12 by means of a follower ring 30 which may be formed from steel, cast-iron, or other suitable material. The follower 30 has a main body portion 32 extending radially from the pipe section 12, a central inwardly-directed rib 34 which is adapted to overlie the gasket 25 and confine it, and an outer, inwardly-directed reinforcing flange or rib 36. The follower body 32 between the ribs 34 and 36 is provided with a plurality of apertures 38 corresponding in number and spacing with the tapered apertures 20 in bell flange 14. While the follower 30 may be in the form of a unitary ring, it is advantageously formed from two semi-circular segments having over-lapping or abutting end portions.

The follower ring 30 is drawn against the gasket 25 by means of bolts 40 which extend through the tapered axial apertures 20 in the bell flange 14 and through the apertures 38 in the follower 30 and are engaged by nuts 42. The heads 44 of the bolts 40 are received on washers 45 which, in the preferred form of our invention, comprise a resilient flexible member formed from the type of rubbery composition of which the gasket 25 is made, or like resilient material. Thus, in the embodiment illustrated in Fig. 1 and Fig. 2, the washer 45 is a two-component unit comprising a metal element 46 and a resilient rubbery element 47 lying against the adjacent surface of the bell flange 14. The metal washer element 46 is conveniently formed with an elliptical aperture 48.

As shown clearly in Fig. 1, the inner edge of the follower rib 34 which overlies the gasket 25 is spaced from the surface of the bell flange 14 to permit various degrees of tightening of the follower against the gasket 25. Since, upon compression of the gasket during application of pressure by the follower, there is a tendency for the gasket to be partly extruded through the annular space between the end of rib 34 and the bell flange, such extrusion is advantageously prevented by providing at the upper forward edge of the gasket 25 an expansible metallic ring 50. The expansible ring 50 is preferably combined with the gasket 25 in a singular unitary structure and is advantageously in the form of an annular armor helix which is molded into the rubber composition of the gasket by known molding means. The ring 50 is preferably imbedded in the gasket so as to be substantially flush with the outer surface of the gasket. When the gasket is compressed, the expansible ring is forced between the rib 34 and the surface of the bell flange 14 and thus effectively closes this gap and prevents extrusion of the rubber material of the gasket. Meanwhile, the gasket 25 is compressed inwardly into the gasket recess defined by the tapered surface 22 and into the space between the throat 19 of the bell flange and the outer surface of the spigot pipe 12 to effect a fluid-tight flexible sealing of the two pipe sections.

It will be apparent that the pipe sections may be joined quickly and easily and that no preliminary preparation of the pipes is necessary. Thus, the spigot section 12 is moved axially into place in the bell throat 19 as shown in Fig. 1. The gasket 25 is then placed around the spigot adjacent the gasket recess surface 22 and the follower 30 placed behind the gasket. The bolts 40 are then inserted through the apertures 20 of the bell flange and the apertures 38 of the follower and the nuts 42 tightened to compress the gasket 25 into sealing position. In the foregoing operation a split gasket and a split follower may be employed. When the gasket and the follower are of continuous annular form, it is of course necessary to slip them over the spigot pipe before the latter is inserted in the bell throat. There is thus obtained an effective fluid-tight joint which permits substantial deflection of the joint, e. g. 3° to 5°, without injury to the joint or the adjacent pipe sections. The taper of the bolt holes 20 permits free movement of the bolts upon deflection of the pipes and the resilient gasket and the resilient washer element prevent chipping or similar damage to the pipe.

Figure 3:
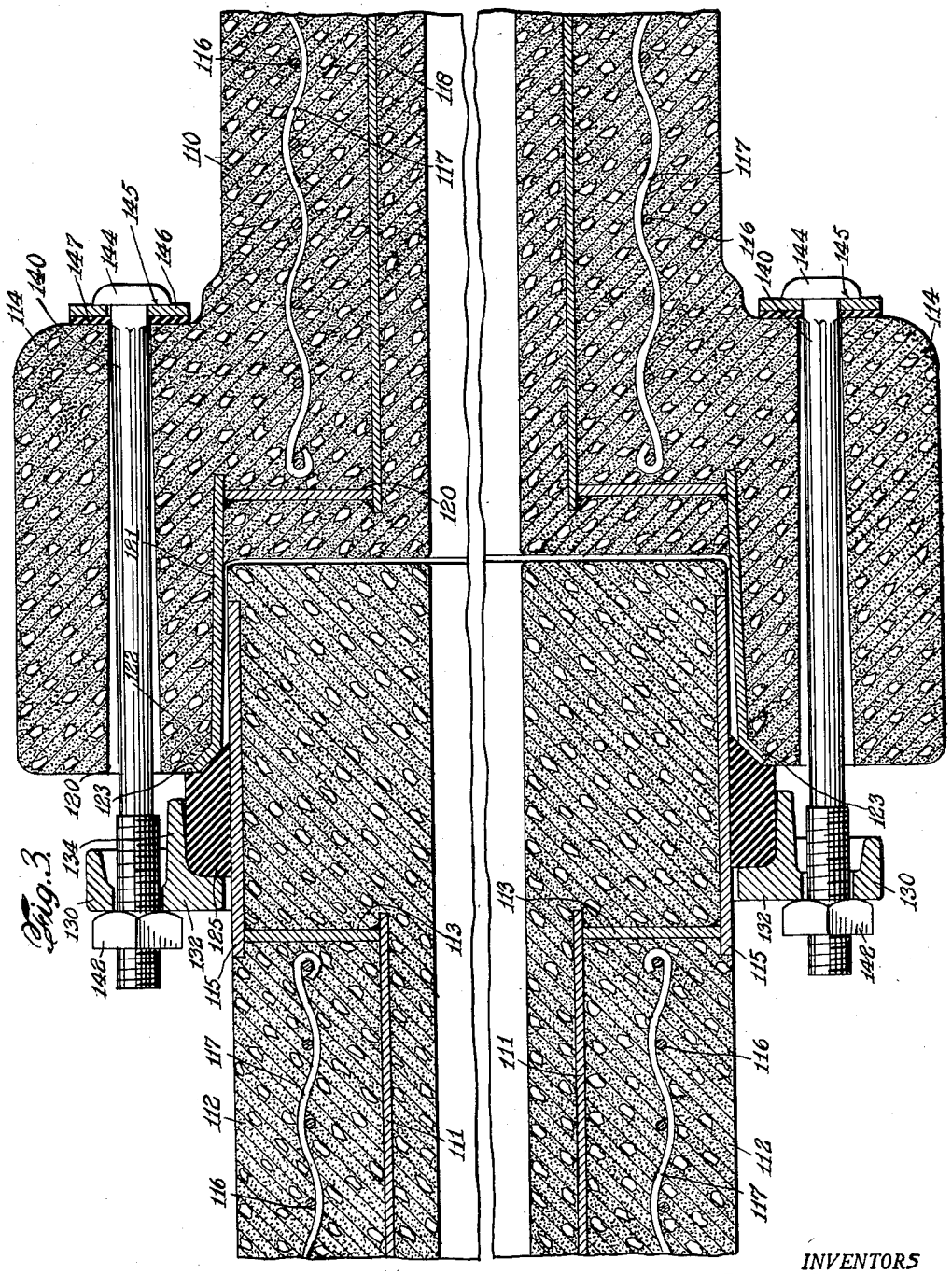
Fig. 3 is a fragmentary sectional view of another joint construction embodying features of the invention.

It will be apparent from the foregoing that our concrete pipe joint assembly is applicable to concrete pipes of various diameters and is equally effective in connection with large diameter concrete pipes of the type formed from concrete-clad relatively light steel cylindrical pipe elements. Referring to Fig. 3, for example, wherein parts corresponding to those shown in Figs. 1 and 2 have been given the same reference numerals with 100 added thereto, there is shown a concrete pipe joint between the spigot end of a pipe 112 and the bell flanged end of a pipe 110. The pipe 112 has embedded in it a relatively thin steel cylinder 111 which has a radial flange portion 113 and a cylindrical extension 115 coincident with the outer end surface of the pipe 112 adjacent the joint. Similarly the bell flanged pipe 110 has embedded in its concrete body a steel cylinder 118 having a radial flange portion 120 and a tubular extension 121. The end of the tubular extension 121 has an outwardly-flared portion 123 coincident with the beveled surface 122. In accordance with conventional practice, the pipes 110 and 112 are formed by shop-welding the embedded steel tubular structure and then providing it with an interior and exterior coating of concrete. Pipes 110 and 112 are also provided with reinforcing wires 116 and 117. The bell flanged pipe 110 is provided with a series of spaced tapered axial apertures 120 in which are received the bolts 140 to draw the follower 130 against the gasket 125, in substantially the manner described in connection with the embodiment shown in Figs. 1 and 2. Reinforcement of the concrete pipe with the steel cylinder structure described is particularly advantageous in the case of large diameter pipes and the arrangement of the cylindrical extensions 115 and 121 effectively reinforces the ends of the abutting pipe sections.

Figure 4:
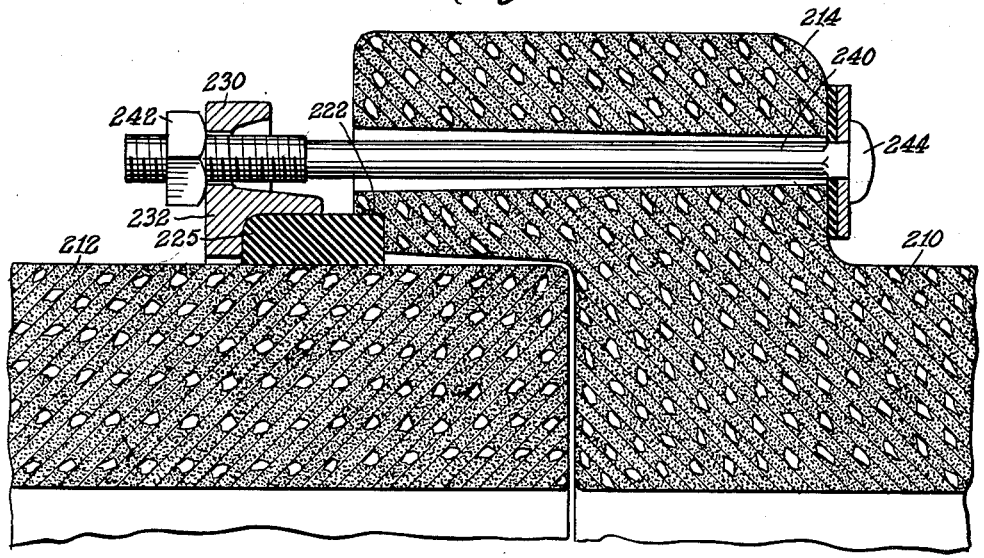
Fig. 4 is a partial sectional view of a modified construction embodying the invention.
Figure 5:
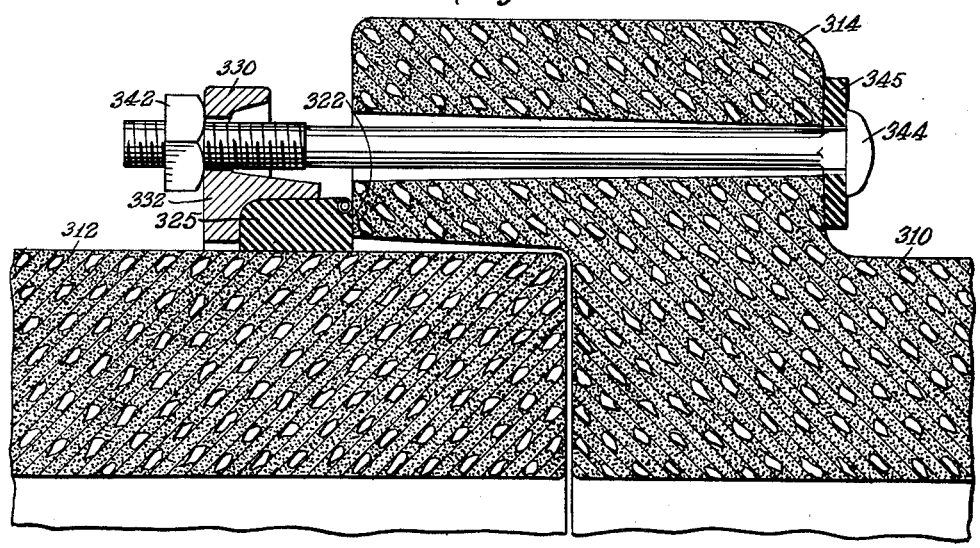
Fig. 5 is a similar view of another form of the joint construction of the invention.

While in the embodiments illustrated in Figs. 1–3, the gasket recess in the bell flange is formed by an inwardly tapered surface 22 (122), the gasket recess may take other forms. Referring to Fig. 4, for example, the tapered surface may be replaced by an annular recess 222 in which the forward end of the gasket 225 is received. In another embodiment, as shown in Fig. 5, the tapered surface and recess may be eliminated and the gasket 325 engaged by the inner portion of the radial end surface 322 of the bell flange 314. Furthermore, as shown in Fig. 5, instead of employing washers comprising a metal element and a resilient element, as in the embodiments of Figs. 1–4, the washers 345 may be formed solely from resilient material, e. g. of the type from which the gasket 25 is formed.

It will be obvious to those skilled in the art that various other changes and modifications may be made in the embodiments of the invention described and illustrated without departing from the scope of the invention as defined in the appended claims and it is intended, therefore, that all matter contained in the foregoing description and in the drawings shall be interpreted as illustrative and not in a limiting sense.

What we claim and desire to secure by Letters Patent is:

1. In a concrete pipe line, end abutting sections of concrete pipe interconnected in fluid-tight relationship, one of said sections having a concrete bell flange defining a central circular aperture and the other of said sections having a concrete spigot end received in said aperture, a plurality of axial passageways extending through said bell flange, the passageways gradually increasing in diameter outwardly in the direction of the outer end of said bell flange, and means for sealing the pipe sections in fluid-tight relationship solely from the exterior of the pipe line, said means comprising compressible gasket means on said second-named pipe section engaging with the adjacent surface of the bell flange, follower means for compressing said gasket means, said follower means confining said gasket means against the concrete spigot, and bolt means extending through said axial passageways and engaging said follower means for urging said follower means toward the bell flange for compressing the gasket into fluid-sealing relationship between the bell flange and the adjacent surface of the second-named pipe section, said bolt means being freely radially pivotable in said passageways about the end of said passageways away from the end of said bell flange and said follower means positively compressing said gasket means independently of relative movements of the pipe sections.

2. In a concrete pipe line, end abutting sections of concrete pipe interconnected in fluid-tight relationship, one of said sections having a concrete bell flange defining a central circular aperture and the other of said sections having a concrete spigot end received in said aperture, a plurality of axial passageways extending through said bell flange, the passageways gradually increasing in diameter outwardly in the direction of the outer end of said bell flange, and means for sealing the pipe sections in fluid-tight relationship solely from the exterior of the pipe line, said means comprising compressible annular gasket means on said second-named pipe section engaging with the adjacent surface of the bell flange, follower means for compressing said gasket means, said follower means confining said gasket means against the concrete spigot, bolt means extending through said axial passageways and engaging said follower means for urging said follower means toward the bell flange for compressing the gasket into fluid-sealing relationship between the bell flange and the adjacent surface of the second-named pipe section, and resilient washer means disposed between the heads of said bolt means and the surface of the bell flange adjacent said axial passageways at the end of said passageways away from the end of said bell flange, said bolt means being freely radially pivotable in said passageways about said end of said passageways and said follower means positively compressing said gasket means independently of relative movements of the pipe sections.

3. In a concrete pipe line, end abutting sections of concrete pipe interconnected in fluid-tight relationship, one of said sections having a concrete bell flange defining a central circular aperture and the other of said sections having a concrete plain end received in said aperture, the peripheral wall of the mouth of said aperture tapering inwardly at an acute angle with respect to the radial plane of the pipe section, a plurality of axial passageways extending through said bell flange, the passageways gradually increasing in diameter outwardly in the direction of the outer end of said bell flange, and means for sealing the pipe sections in fluid-tight relationship solely from the exterior of the pipe lines, said means comprising compressible gasket means on said second-named pipe section engaging with the tapered surface of the bell flange, follower means for compressing said gasket means, said follower means confining said gasket means against the concrete spigot, and bolt means extending through said axial passageways engaging said follower means for urging said follower means toward the bell flange for compressing the gasket into fluid-sealing relationship between the bell flange and the adjacent surface of the second-named pipe section, and resilient washer means disposed between the heads of said bolt means and the surface of the bell flange adjacent said axial passageways, said bolt means being freely radially pivotable in said passageways about the end of said passageways away from the end of said bell flange and said follower means positively compressing said gasket means independently of relative movements of the pipe sections.

4. In a concrete pipe line, end abutting sections of concrete pipe interconnected in fluid-tight relationship, one of said sections having a concrete bell flange defining a central circular aperture and the other of said sections having a concrete spigot end received in said aperture, the peripheral wall of the mouth of said aperture being formed with an annular recess, a plurality of axial passageways extending through said bell flange, the passageways gradually increasing in diameter outwardly in the direction of the outer end of said bell flange, and means for sealing the pipe sections in fluid-tight relationship solely from the exterior of the pipe line, said means comprising compressible annular gasket means on said second-named pipe section engaging with the annular recess of the bell flange, follower means for compressing said gasket means, said follower means confining said gasket means against the concrete spigot, and bolt means extending through said axial passageways and engaging said follower means for urging said follower means toward the bell flange for compressing the gasket into fluid-sealing relationship between the bell flange and the adjacent surface of the second-named pipe section, said bolt means being freely radially pivotable in said passageways about the end of said passageways away from the end of said bell flange and said follower means positively compressing said gasket means independently of relative movements of the pipe sections.

5. In a concrete pipe line, end abutting sections of concrete pipe interconnected in fluid-tight relationship, one of said sections having a concrete bell flange defining a central circular aperture and the other of said sections having a concrete spigot end received in said aperture, a plurality of axial passageways extending through said bell flange, the passageways gradually increasing in diameter outwardly in the direction of the outer end of said bell flange, and means for sealing the pipe sections in fluid-tight relationship solely from the exterior of the pipe line, said means comprising compressible annular gasket means on said second-named pipe section engaging with the adjacent surface of the bell flange, follower means for compressing said gasket means, said follower means confining said gasket means against the concrete spigot, bolt means extending through said axial passageways and engaging said follower means for urging said follower means toward the bell flange for compressing the gasket into fluid-sealing relationship between the bell flange and the adjacent surface of the second-named pipe section, and resilient washer means disposed between the heads of said bolt means and the surface of the bell flange adjacent said tapered apertures, said first-named pipe section comprising a concrete-clad metal cylinder having a portion substantially flush with the peripheral surface of said central circular aperture and said second-named pipe section comprising a concrete clad metal cylinder having a portion substantially flush with the peripheral surface of said spigot end, said bolt means being freely radially pivotable in said passageways about the end of said passageways away from the end of said bell flange and said follower means positively compressing said gasket means independently of relative movements of the pipe sections.

6. In a concrete pipe line, end abutting sections of concrete pipe interconnected in fluid-tight relationship, one of said sections having a concrete bell flange defining a central circular aperture and the other of said sections having a concrete plain end received in said aperture, the peripheral wall of the mouth of said aperture tapering inwardly at an acute angle with respect to the radial plane of the pipe section, a plurality of axial passageways extending through said bell flange, the passageways gradually increasing in diameter outwardly in the direction of the outer end of said bell flange, and means for sealing the pipe sections in fluid-tight relationship solely from the exterior of the pipe line, said means comprising compressible gasket means on said second-named pipe section engaging with the tapered surface of the bell flange, follower means for compressing said gasket means, said follower means confining said gasket means against the concrete spigot, and bolt means extending through said axial passageways engaging said follower means for urging said follower means toward the bell flange for compressing the gasket into fluid-sealing relationship between the bell flange and the adjacent surface of the second-named pipe section, and resilient washer means disposed between the heads of said bolt means and the surface of the bell flange adjacent said tapered apertures, said first-named pipe section comprising a concrete-clad metal cylinder having a portion substantially flush with the peripheral surface of said central circular aperture and said second-named pipe section comprising a concrete clad metal cylinder having a portion substantially flush with the peripheral surface of said spigot end, said bolt means being freely radially pivotable in said passageways about the end of said passageways away from the end of said bell flange and said follower means positively compressing said gasket means independently of relative movements of the pipe sections.

7. In a concrete pipe line, end abutting sections of concrete pipe interconnected in fluid-tight relationship, one of said sections having a concrete bell flange defining a central circular aperture and the other of said sections having a concrete spigot end received in said aperture, a plurality of axial passageways extending through said bell flange, the passageways gradually increasing in diameter outwardly in the direction of the outer end of said bell flange, and means for sealing the pipe sections in fluid-tight relationship solely from the exterior of the pipe line, said means comprising compressible annular gasket means on said second-named pipe section engaging with the adjacent surface of the bell flange, follower means for compressing said gasket means, said follower means having an axial rib overlying and confining the gasket means against the concrete spigot, bolt means extending through said axial passageways and engaging said follower means for urging said follower means toward the bell flange for compressing the gasket into fluid-sealing relationship between the bell flange and the adjacent surface of the second-named pipe section, and resilient washer means disposed between the heads of said bolt means and the surface of the bell flange adjacent said axial passageways, the axial width of said bell flange being substantially greater than the axial width of said follower means, said bolt means being freely radially pivotable in said passageways about the end of said passageways away from the end of said bell flange and said follower means positively compressing said gasket means independently of relative movements of the pipe sections.

References Cited in the file of this patent

UNITED STATES PATENTS

| | | |
|---|---|---|
| 679,459 | Johnson et al. | July 30, 1901 |
| 944,273 | Osborne | Dec. 28, 1909 |
| 1,475,867 | Peterson | Nov. 27, 1923 |
| 1,770,180 | Mitchell | July 8, 1930 |
| 2,009,650 | Claussen | July 30, 1935 |
| 2,158,829 | Miller | May 16, 1939 |
| 2,359,046 | Miller | Sept. 26, 1944 |
| 2,643,904 | Wehmanen | June 30, 1953 |
| 2,648,551 | Risler et al. | Aug. 11, 1953 |

FOREIGN PATENTS

| | | |
|---|---|---|
| 105,160 | Australia | Sept. 29, 1938 |
| 521,016 | Great Britain | May 9, 1940 |